A. E. LOTSTROM.
NUT LOCKING DEVICE.
APPLICATION FILED JAN. 16, 1915.
1,138,878.
Patented May 11, 1915.
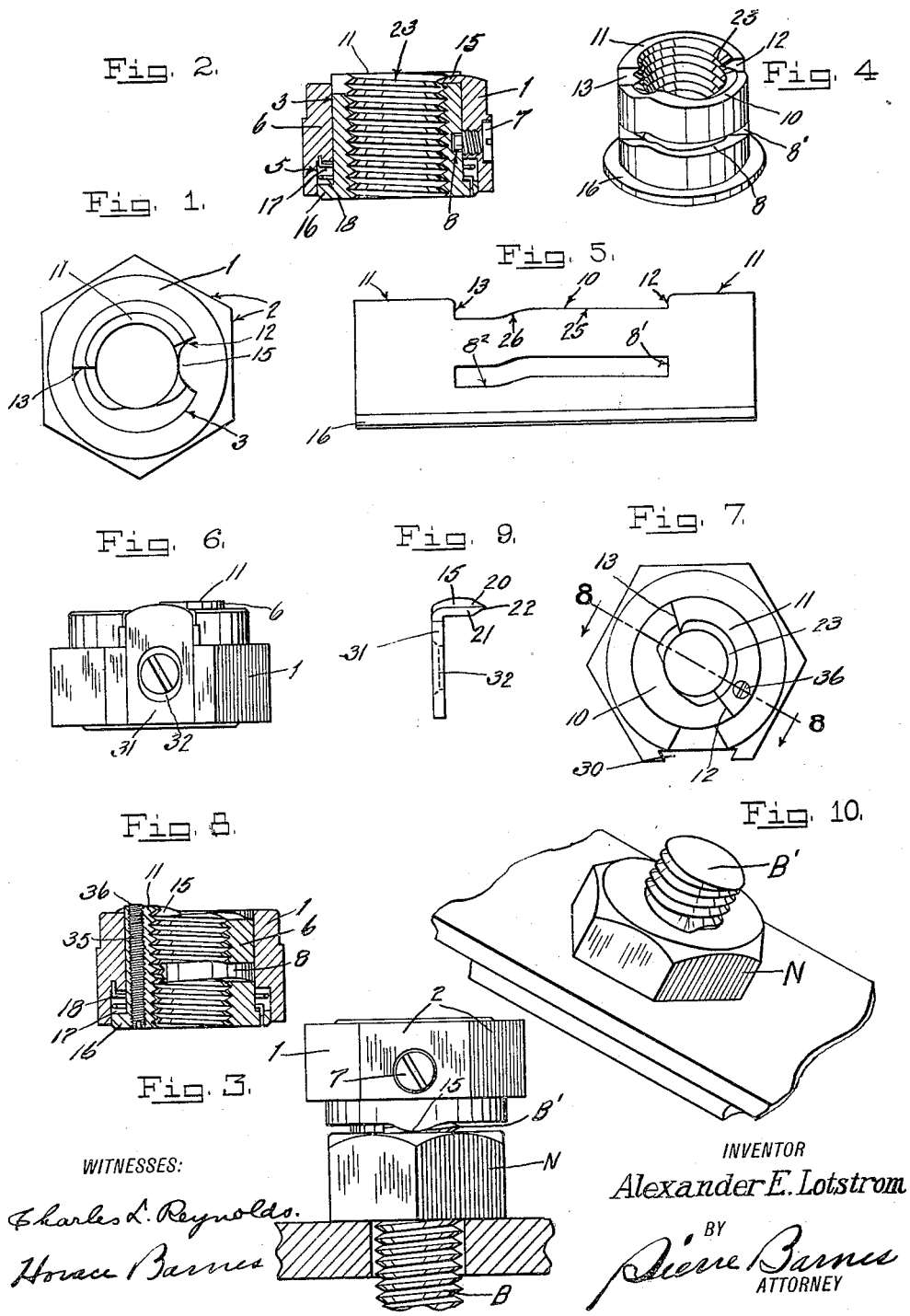
WITNESSES:
Charles L. Reynolds.
Horace Barnes
INVENTOR
Alexander E. Lotstrom
BY
Pierre Barnes
ATTORNEY

UNITED STATES PATENT OFFICE.

ALEXANDER E. LOTSTROM, OF SEATTLE, WASHINGTON.

NUT-LOCKING DEVICE.

1,138,878.     Specification of Letters Patent.     Patented May 11, 1915.

Application filed January 16, 1915. Serial No. 2,527.

*To all whom it may concern:*

Be it known that I, ALEXANDER E. LOTSTROM, a citizen of the United States, residing at Seattle, in the county of King and State of Washington, have invented certain new and useful Improvements in Nut-Locking Devices, of which the following is a specification.

This invention relates to improvements in devices for locking nuts in operative condition upon bolts; and has for its object the provision of simple and efficient means whereby the screw thread of the bolt may be deflected and caused to bear upon the outer surface of the nut to prevent its reverse rotation and loosening from its set position. Other objects and advantages of the invention will be apparent from the further description following.

In the accompanying drawings, Figure 1 is a top plan view of a nut locking device embodying my invention. Fig. 2 is a vertical sectional view of the same. Fig. 3 is a view in side elevation of my nut locking device shown applied to a bolt in position to lock a nut thereto. Fig. 4 is a perspective view of the cam bushing element of my device shown detached. Fig. 5 is a view in plan of a development of said bushing illustrating particularly the cam surfaces. Fig. 6 is a side elevation of a modified form of the invention. Fig. 7 is a top plan view of Fig. 6. Fig. 8 is a vertical cross section through 8—8 of Fig. 7. Fig. 9 is a detached view in side elevation of an element of the modified device as shown in Fig. 6. Fig. 10 is a perspective view of a bolt and nut in operative position illustrating the work accomplished by an application of my invention.

Referring to the embodiment of my invention shown in Figs. 1 to 4, inclusive, the reference numeral 1 designates a die-member formed exteriorly with opposing parallel plane surfaces 2 for engagement by a wrench. Said member is formed with a circular bore 3 extending axially therethrough and is further counter-bored at its outer end, as at 5, concentrically of said bore 2.

A circular cam-bushing 6 is secured for limited rotation within the bore of the die-member through a screw 7 engaging within a slot 8 in the side wall of said bushing. The inner end of said bushing is formed with a cam-face 10 to be hereinafter more particularly described, constituting approximately one-half the perimeter of the bushing, and a contact edge 11 extending for the remaining portion around the inner end. Between said contact edge and the cam-face are provided stops 12 and 13 to limit the relative rotation of the die and bushing through the interference of an inwardly protruding tongue 15 of the die-member 1 therewith.

A circular flange 16 on the outer end of said bushing is adapted to enter said counter-bored portion 5 of the die-member affording a circular chamber 17 wherein is positioned a coil-spring 18 whose opposite ends are respectively engaged with said die-member and the bushing so that the latter is yieldingly urged in the direction to normally maintain the tongue 15 in contact with the stop 12. Said cam-face 10 is adapted to guide and exert a longitudinally directed force upon the tongue 15 which acts upon the bolt-thread to deflect the latter for a distance from its normal inclined plane to bear upon the top surface of the nut. The face 20 of said tongue bears upon said cam and its outer face 21 engages the outer surface of the thread upon the bolt while the point 22 of the tongue enters the groove of the bolt-thread immediately in line with the innermost thread 23 of the bushing in the contact-edge portion 11 where the tongue is yieldingly held in juxtaposition with the stop 12.

Referring particularly to Fig. 5 showing a development of said bushing, the cam-face 10 is seen to be inclined inwardly from the stop 12, as at 25, so that when placed in operative position upon a bolt, the inclination of said cam-face will be in oppositely inclined relation to the threads of the bolt. At 26 said cam-face is inclined in an outward direction to release the bolt-thread from pressure and convey the tongue 15 when operated outwardly in line with the normal plane of the bolt-thread so that the tongue engages the stop 13 and the bushing is rotated with the die-member and loosened from the bolt, as will be presently described.

When assembled in operative condition, as described and indicated in Figs. 1 and 2, the nut-locking device of my invention is applied to the end of a bolt, as B¹, (see Fig. 10) projecting beyond the securing nut N, in the manner illustrated in Fig. 3, wherein the bolt is designated by the reference character B.

The inner end of the device is presented to the bolt-end B¹ having screw-threads corresponding to those of the die-bushing and the entire device screwed upon the bolt-end by engaging a wrench with the faces 2 thereof. The die and bushing are rotated together to screw the device upon the bolt through the engagement of the tongue 15 with the stop 12 and also the engagement of the screw 7 with the end 8¹ of the slot 8. The tongue 15 is thus threaded into the groove of the bolt-thread and when the device is brought to rest through the contact of the edge 11 with the outer face of the nut, said tongue is positioned immediately above the salient thread portion where the latter emerges above the face of the nut.

The device is given sufficient additional pressure in the rotary direction to screw the device upon the bolt to exert a tensional strain upon the bolt to secure the same against reverse movement during the early reverse movement of the die. When the bushing is thus secured, the die member is given a reversely directed movement in opposition to the spring 18 through the wrench which causes it to move relatively of the bushing. In such reverse movement the tongue surface 21 which bears upon the bolt-thread is guided by the contact of its opposite surface 20 upon the cam-face 10 in an approximately horizontal plane or at a relatively slight angle opposite to the normal pitch of the bolt-thread and presses the bolt-thread down upon the upper surface of the nut, as indicated in Fig. 10, which effectually prevents the accidental dislodgment of the nut. Said tongue is further reversed until at 26 the cam-pressure is relieved therefrom and it follows the normal trend of the thread-groove through the engagement of its point 22 therewith. A further movement of the die brings the tongue in contact with the stop 13, whereupon the bushing is released from its securement with the bolt, and is backed off with the die-member.

When the device is entirely released from the bolt and the wrench-pressure in the reverse direction removed, the spring 18 asserts itself and the die and bushing members are relatively rotated to bring the tongue 15 again in its original position in engagement with the stop 12, whereupon it is in condition to be immediately used upon another bolt.

It will be understood that the invention thus described in its preferred and simplified form may be changed in its details and modified in its arrangement within the scope of the appended claims, and still retain its peculiar advantages. For instance, the pressure exerted upon the tongue 15 to afford the necessary resistance to the bolt-thread to reform the latter, may be given it through the contact of the screws 7 with the outer edge 8² of the slot 8, or through coöperating and simultaneous pressure exerted through both the cam face 10 and said edge 8²; also the tongue 15 may be made detachable from the die member, as indicated in Figs. 6, 7 and 9, whereby the tongue may be renewed or adjusted to compensate for any wear thereon. In such modification, the die-member is provided with a longitudinally arranged dovetail slot, as indicated by the reference numeral 30, while the tongue-member is formed with a correspondingly shaped shank 31 which is provided with a circular or elongated slot 32 through which the screw 7 is entered and which serves to bind said shank to the die in adjusted positions.

It is desirable that the tongue 15 shall be positioned above the bolt-thread as close to where the latter emerges from the nut as possible. This position of the tongue is controlled by the arrangement of the contact edge 11 with the outer face of the nut. When new, such contact edge is suitably arranged to correctly position the tongue 15 relative to the bolt-thread. After considerable usage, said contact edge may be worn sufficiently to throw the tongue in a disadvantageous position. An adjustment screw 35 is therefore provided, extending longitudinally through the bushing 6 and through the contact portion 11 in proximity to the stop 12. The inner face 36 of said screw is adapted to be set to contact with the outer face of the nut to compensate for any wear that may have affected the contact edge 11.

It will be seen that the invention is of very simple construction, consisting of two major parts, a securing screw and a light spring.

It is also a device having a simple and convenient mode of operation, as it is screwed upon the bolt as one would screw a nut thereon, and when thus positioned the motion of the wrench is reversed, performing the operative function thereof of pressing the bolt-thread upon the nut while a continuance of the same movement releases the device from the bolt. When the device is removed from the bolt, it automatically returns to its original position ready for the next service.

As indicated in Fig. 10, the thread of the bolt is pressed closely upon the nut with an increasing force for a distance, which, without releasing the bolt from the tension exerted thereon by the nut, prevents the latter from any turning movement and the loosening of its support to the work with which used. In thus deflecting the thread from its normal direction, the thread is not mutilated to any extent but merely deflected. By putting sufficient pressure upon the wrench with which the nut is to be removed from the bolt, the thread will be forced back into its original course and direction so that the nut can be removed therefrom without danger to the nut or rendering the bolt incapable of further use.

What I claim as my invention, is—

1. In a device of the character described, a die-member formed with a longitudinal bore and a tongue projecting into said bore, a bushing rotatively mounted in said bore formed with interior screw-threads adapted to engage with screw-threads of a bolt, and a cam-surface upon one end of said bushing engageable by said tongue to guide the latter in its contact with the bolt-thread.

2. In a device of the character described, a die-member formed with a longitudinal bore and a tongue projecting into said bore, a bushing rotatively secured in said bore and provided with internal screw-threads engageable with the screw-threads of a bolt, and means upon said bushing for guiding said tongue in the relative rotative movements of the die-member and bushing whereby said tongue is caused to engage and deflect the bolt-thread.

3. In a device of the character described, a die-member formed with a longitudinal bore and a tongue projecting into said bore, a bushing rotatively secured in said bore provided with means for connection with a bolt, and a cam surface upon said bushing engageable by said die-member in its limited reverse movement relative to said bushing whereby the die-member is given longitudinal movement during which said tongue is caused to deflect the thread of said bolt.

4. In a device of the character described, a die-member formed with a longitudinal bore and a tongue projecting into said bore, a bushing rotatively mounted in said bore formed with interior screw-threads in alinement with said tongue and adapted to engage with the screw-threads of a bolt, a cam-surface upon one end of said bushing engageable by said tongue to guide the latter in its contact with the bolt-thread and stops provided at each end of said cam-surface to limit the rotary movement of said tongue.

5. In a device of the character described, a die-member formed with a longitudinal bore and a tongue projecting into said bore, a bushing rotatively mounted in said bore formed with interior screw-threads adapted to engage with screw-threads of a bolt, a cam-surface upon one end of said bushing engageable with said tongue to guide the latter in its contact with the bolt-thread, a slot in said bushing relatively conforming to the configuration of said cam-surface, and a projection from said die-member entering said slot.

6. In a device of the character described, a die-member formed with a longitudinal bore and a tongue projecting into said bore, and a bushing rotatively mounted in said bore formed with interior screw-threads in alinement with said tongue and adapted to engage with the screw-threads of a bolt, said bushing having a cam surface inclined in opposite directions to the bushing-thread and engageable by said tongue to guide the latter in its contact with the bolt-thread.

7. In a device of the character described, a die-member formed with a longitudinal bore and a tongue projecting into said bore, a bushing rotatively mounted in said bore formed with interior screw-threads in alinement with said tongue and adapted to engage with the screw-threads of a bolt, said bushing having a cam surface inclined at one end in opposition to the screw-thread of the bushing and at its terminal end formed with a releasing notch to admit said tongue to the normal line of the bolt-thread.

8. In a device of the character described, a die-member formed with a longitudinal bore and a tongue projecting into said bore, a bushing rotatively mounted in said bore formed with interior screw-threads adapted to engage with screw-threads of a bolt, a cam-surface upon one end of said bushing engageable by said tongue to guide the latter in its contact with the bolt-thread, and means to adjust the contact of the bushing upon the nut of the bolt with which it is engaged.

Signed at Seattle, Washington, this 4th day of January, 1915.

ALEXANDER E. LOTSTROM.

Witnesses:
  E. PETERSON,
  HORACE BARNES.